United States Patent
Park et al.

(10) Patent No.: US 11,560,632 B2
(45) Date of Patent: Jan. 24, 2023

(54) MEMBRANE, MEMBRANE ELECTRODE ASSEMBLY, AND WATER ELECTROLYZER INCLUDING THE SAME

(71) Applicant: 3M INNOVATIVE PROPERTIES COMPANY, St. Paul, MN (US)

(72) Inventors: Jiyoung Park, Woodbury, MN (US); Krzysztof A. Lewinski, Mahtomedi, MN (US); Sean M. Luopa, Minneapolis, MN (US); Andrew J. L. Steinbach, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/586,574

(22) Filed: Sep. 27, 2019

(65) Prior Publication Data

US 2020/0102659 A1 Apr. 2, 2020

Related U.S. Application Data

(60) Provisional application No. 62/737,165, filed on Sep. 27, 2018.

(51) Int. Cl.
*C25B 1/04* (2021.01)
*C25B 13/08* (2006.01)
(Continued)

(52) U.S. Cl.
CPC .............. *C25B 1/04* (2013.01); *C25B 9/23* (2021.01); *C25B 9/73* (2021.01); *C25B 11/081* (2021.01); *C25B 13/08* (2013.01)

(58) Field of Classification Search
CPC .......... C25B 13/08; C25B 11/097; C25B 1/04
See application file for complete search history.

(56) References Cited

U.S. PATENT DOCUMENTS 4,340,276 A 7/1982 Maffitt
4,568,598 A 2/1986 Bilkadi
(Continued)

FOREIGN PATENT DOCUMENTS

EP 0631337 A2 * 12/1994 ............ C25B 13/08
EP 2704239 A1 5/2014
(Continued)

OTHER PUBLICATIONS

Chow, "Fabrication of Biologically Based Microstructure Composites for Vacuum Field Emission", Materials Science and Engineering: A, Oct. 1992, vol. 158, No. 1, pp. 1-6.
(Continued)

*Primary Examiner* — Harry D Wilkins, III
(74) *Attorney, Agent, or Firm* — Bradford B. Wright (57) ABSTRACT

A water electrolyzer comprises a membrane, a cathode and an anode. The membrane comprises a first membrane layer comprising a first ion-conductive polymer, a second membrane layer comprising a second ion-conductive polymer, and a platinized nanostructured layer disposed between the first layer and the second layer. The platinized nanostructured layer comprises close-packed whiskers having at least one of platinum or platinum oxide disposed thereon. The cathode is disposed on the membrane and comprises a first catalyst consisting essentially of both metallic Pt and Pt oxide. The anode is disposed on the opposite surface of the membrane and comprises a second catalyst comprising at least 95 percent by weight of collectively metallic Ir and Ir oxide, calculated as elemental Ir, based on the total weight of the second catalyst, wherein at least one of metallic Ir or Ir oxide is present. Membranes and methods of making them are also disclosed.

12 Claims, 5 Drawing Sheets

(51) Int. Cl.
  *C25B 9/23* (2021.01)
  *C25B 11/081* (2021.01)
  *C25B 9/73* (2021.01)

(56) References Cited

U.S. PATENT DOCUMENTS

| | | | |
|---|---|---|---|
| 4,812,352 | A | 3/1989 | Debe |
| 5,039,561 | A | 8/1991 | Debe |
| 5,338,430 | A | 8/1994 | Parsonage |
| 5,342,494 | A * | 8/1994 | Shane ................. C25B 9/23 204/252 |
| 5,472,799 | A | 12/1995 | Watanabe |
| 5,766,787 | A * | 6/1998 | Watanabe ........... H01M 8/1051 429/494 |
| 5,800,938 | A | 9/1998 | Watanabe |
| 5,879,827 | A | 3/1999 | Debe |
| 6,040,077 | A | 3/2000 | Debe |
| 6,136,412 | A | 10/2000 | Spiewak |
| 6,319,293 | B1 | 11/2001 | Debe |
| 6,624,328 | B1 | 9/2003 | Guerra |
| 7,348,088 | B2 | 3/2008 | Hamrock |
| 7,419,741 | B2 | 9/2008 | Vernstrom |
| 7,901,829 | B2 | 3/2011 | Debe |
| 7,976,989 | B2 | 7/2011 | Lopez et al. |
| 2002/0004453 | A1 | 1/2002 | Haugen |
| 2002/0058172 | A1 * | 5/2002 | Datz ................... H01M 8/1053 429/414 |
| 2002/0100725 | A1 | 8/2002 | Lee |
| 2004/0048466 | A1 | 3/2004 | Gore |
| 2004/0116742 | A1 | 6/2004 | Guerra |
| 2007/0037030 | A1 | 2/2007 | Ogami |
| 2008/0113242 | A1 | 5/2008 | Smith |
| 2011/0036935 | A1 | 2/2011 | Stehr |
| 2014/0116877 | A1 * | 5/2014 | Guillet .................... C25B 13/00 204/282 |
| 2014/0246304 | A1 | 9/2014 | Debe |
| 2018/0062192 | A1 * | 3/2018 | Capuano ............. H01M 8/1055 |
| 2018/0274110 | A1 * | 9/2018 | Nakano ................... C25B 13/08 |
| 2020/0017980 | A1 * | 1/2020 | Lewinski .................. C25B 9/23 |
| 2020/0099061 | A1 * | 3/2020 | Price ....................... C25B 13/08 |
| 2022/0243339 | A1 * | 8/2022 | Yang ......................... C25B 9/19 |
| 2022/0243344 | A1 * | 8/2022 | Yang ...................... C25B 11/053 |
| 2022/0251721 | A1 * | 8/2022 | Gubler ................. C23C 18/1641 |

FOREIGN PATENT DOCUMENTS

| | | | |
|---|---|---|---|
| WO | WO 2016-191057 | 12/2016 | |
| WO | WO 2018/115821 A1 * | 6/2018 | ............. C25B 13/08 |
| WO | WO 2018-185615 | 10/2018 | |
| WO | WO 2018-185616 | 10/2018 | |
| WO | WO 2018-185617 | 10/2018 | |

OTHER PUBLICATIONS

Debe, "Effect of Gravity on Copper Phthalocyanine Thin Films III: Microstructure Comparisons of Copper Phthalocyanine Thin Films Grown in Microgravity and Unit Gravity", Thin Solid Films, 1990, vol. 186, pp. 327-347.
Debe, "Vacuum Vapor Deposited Thin Films of a Perylene Dicarboximide Derivative: Microstructure Versus Deposition Parameters", Journal of Vacuum Science and Technology, May-Jun. 1988, vol. 6, No. 3, pp. 1907-1911.
Hou, "High-Performance Membrane Electrode Assembly with Multi-Functional Pt—SnO2eSiO2—C Catalyst for Proton Exchange Membrane Fuel Cell Operated under Low-Humidity Conditions", International Journal of Hydrogen Energy, Jun. 2016, vol. 41, No. 21, pp. 9197-9203.
Kam, "Summary Abstract: Dramatic Variation of the Physical Microstructure of A Vapor Deposited Organic Thin Film", Journal of Vacuum Science & Technology A, Jul. 1987, vol. 5, No. 4, pp. 1914-1916.
Lee, "Measurement and Modeling of the Reflectance-Reducing Properties of Gradient Index Microstructured Surfaces", Photographic Science and Engineering, Jul.-Aug. 1980, vol. 24, No. 4, pp. 211-216.
Luo, "Tin and Silicon Binary Oxide on the Carbon Support of a Pt Electrocatalyst with Enhanced Activity and Durability", ACS Catalysis, Apr. 2015, vol. 5, No. 4, pp. 2242-2249.
Ohnuma, "Amorphous Ultrafine Metallic Particles Prepared by Sputtering Method", Proceedings of the Fifth International Conference on Rapidly Quenched Metals, Sep. 1984, pp. 1117-1124.
Sadaoka, "Effects of Morphology on NO2 Detection in air at Room Temperature with Phthalocyanine Thin Films", Journal of Materials Science, 1990, vol. 25, pp. 5257-5268.
Tang, "High dispersion and Electrocatalytic Properties of Platinum on Well-Aligned Carbon Nanotube Arrays", Carbon, 2004, vol. 42, pp. 191-197.
Wang, "Controlling Fuel Crossover and Hydration in Ultrathin Proton Exchange Membrane-Based Fuel Cells using Pt-Nanosheet Catalysts", Journal of Materials Chemistry A, Oct. 2014, vol. 2, No. 39, pp. 16416-16423.
Watanabe, "Analyses of Self-Humidification and Suppression of Gas Crossover in Pt-Dispersed Polymer Electrolyte Membranes for Fuel Cells", Journal of the Electrochemical Society, 1998, vol. 145, No. 4, pp. 1137-1141.
Watanabe, "Self-Humidifying Polymer Electrolyte Membranes for Fuel Cells", Journal of the Electrochemical Society, 1996, vol. 143, No. 12, pp. 3847-3852.

* cited by examiner

MEMBRANE, MEMBRANE ELECTRODE ASSEMBLY, AND WATER ELECTROLYZER INCLUDING THE SAME

TECHNICAL FIELD

The present disclosure broadly relates to membranes and membrane electrode assemblies that can be useful in a water electrolyzer, and methods of using the same.

BACKGROUND

Water electrolyzers are common electrochemical devices for producing ultra-pure (e.g., typically, at least 99.9% pure) hydrogen from pure water. In the case of proton exchange membrane (PEM) based water electrolyzers, hydrogen can be obtained at high pressure. These electrolyzers often contain membrane electrode assemblies (MEAs) that are similar to proton exchange membrane electrode assemblies for fuel cells. PEM based water electrolyzers, however, produce hydrogen at the cathode via a hydrogen evolution reaction (HER) and oxygen at the anode via an oxygen evolution reaction (OER). The designation of the electrodes as anode or cathode in an electrochemical device follows the International Union of Pure and Applied Chemistry (IUPAC) convention that the anode is the electrode at which the predominant reaction is oxidation (e.g., the $H_2$ oxidation electrode for a fuel cell, or the water oxidation/$O_2$ evolution reaction electrode for a water or $CO_2$ electrolyzer).

Higher operating pressures on the water electrolyzer cathode (e.g., even approaching 50 bar (5 MPa)) create a situation known in the field as hydrogen crossover, where the hydrogen gas ($H_2$) crosses from the cathode where it is produced through the PEM, back to the anode. This situation creates both an efficiency loss and, in some situations, an undesired amount of $H_2$ mixing with the anode gas ($O_2$) (e.g., exceeding 4 vol. %, which is about the lower explosive limit (LEL)).

There is a desire to mitigate this crossover of hydrogen to the anode.

SUMMARY

In a first aspect, the present disclosure provides a water electrolyzer comprising:

a membrane having first and second opposed major surfaces and comprising:
  a first membrane layer comprising a first ion-conductive polymer;
  a second membrane layer comprising a second ion-conductive polymer; and
  a platinized nanostructured layer disposed between the first layer and the second layer, wherein the platinized nanostructured layer comprises close-packed whiskers having at least one of platinum or platinum oxide disposed thereon;
a cathode disposed on the first major surface of the membrane, the cathode comprising a first catalyst consisting essentially of either or both of metallic Pt and Pt oxide; and
an anode disposed on the second major surface of the membrane, the anode comprising a second catalyst, the second catalyst comprising at least 95 percent by weight of collectively metallic Ir and Ir oxide, calculated as elemental Ir, based on the total weight of the second catalyst, wherein at least one of metallic Ir or Ir oxide is present.

In a second aspect, the present disclosure provides a method of generating hydrogen and oxygen from water, the method comprising:
providing a water electrolyzer according to the present disclosure;
providing water in contact with the anode; and
providing an electrical current with sufficient potential difference across the membrane to convert at least a portion of the water to hydrogen and oxygen on the cathode and anode, respectively.

Advantageously, membranes including a platinized nanostructured layer according to the present disclosure can be made thinner than conventionally prepared catalyst layer having simply dispersed Pt/carbon, $Pt/SnO_2$, $Pt/Al_2O_3$, $Pt/TiO_2$, $Pt/Ta_2O_5$, $Pt/ZrO_2$, $Pt/HfO_2$, $Pt/Nb_2O_5$, or platinum/platinized nanostructured film (Pt/NSTF) fragments. Further, membranes according to the present disclosure can effectively mitigate hydrogen crossover in a proton exchange membrane (PEM) water electrolyzer via catalytic recombination of $H_2$ (g) and $O_2$ (g) within the membrane while maintaining low ionic resistance.

As Used Herein:

The term "microstructured" means having a predominance of surface features on the order of >0.5 to 500 μm (microns).

The term "nanostructured" means having a predominance of surface features on the order of 0.001 to 0.5 μm.

The term "perfluorinated" means having multiple C—F bonds, but no C—H bonds or carbon-halogen bonds. Other atoms (including hydrogen and/or halogen if not bonded to carbon) may be present.

Features and advantages of the present disclosure will be further understood upon consideration of the detailed description as well as the appended claims.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Single-cell water electrolyzers are known, but water electrolyzers typically comprise a plurality (e.g., at least two) of cells that in turn comprise a membrane, cathode, and anode.

Figure 1:
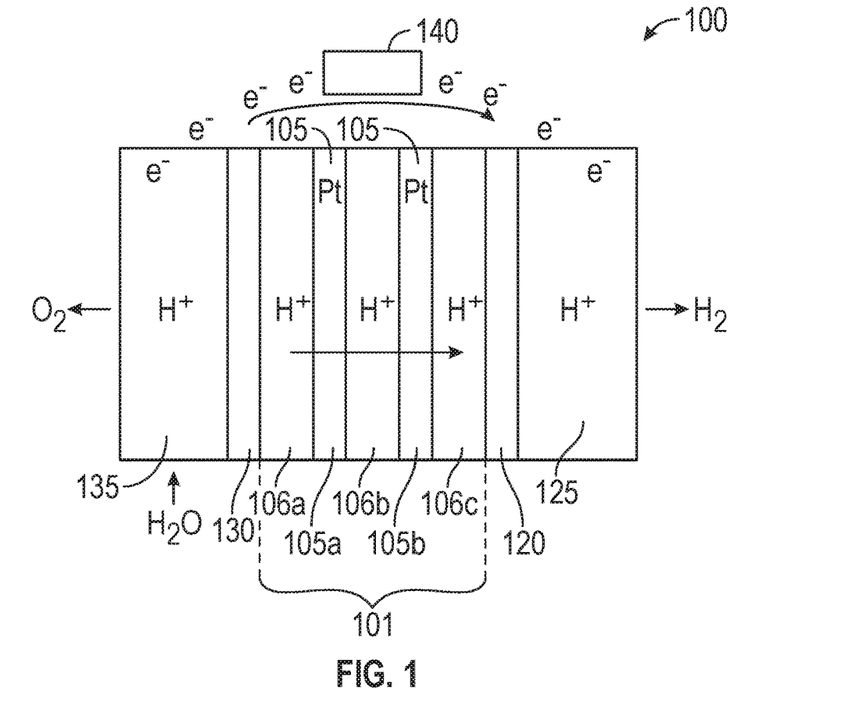
FIG. 1 is a schematic of an exemplary water electrolyzer described herein.

Referring to FIG. 1, exemplary water electrolyzer cell 100 comprising membrane 101, cathode 120, and anode 130. Membrane 101 comprises first platinized nanostructured layer 105a sandwiched between first and second membrane layers 106a and 106b. First platinized nanostructured layer 105a includes a layer of platinum catalyst disposed on a nanostructured support. Optional second platinized nanostructured layer 105b, which is the same as platinized nanostructured layer 105a, is disposed between second membrane layer 106b and optional third membrane layer 106c. Membrane layers 106a, 106b, and 106c may be unitary or laminates of two or more layers (e.g., films), for example.

FIGS. 2A-2E depict various exemplary membrane configurations according to the present disclosure corresponding to configurations prepared in Examples 1-5 hereinbelow.

Figure 2A:
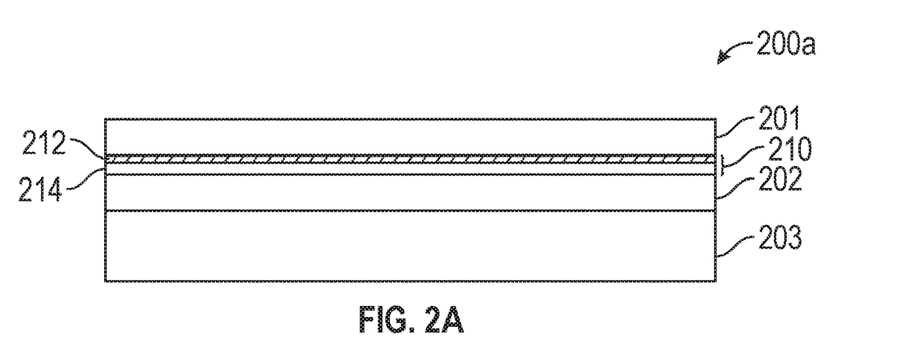
FIGS. 2A-2E are schematic side views of various exemplary membranes described herein.

Referring now to FIG. 2A, membrane 200a comprises first ion-conductive polymer layers 201, 202, and 203, which may be the same or different. Platinized nanostructured layer 210 comprises microstructured support 214 composed of close-packed whiskers (not shown) and platinum-containing catalyst layer 212.

Figure 2B:
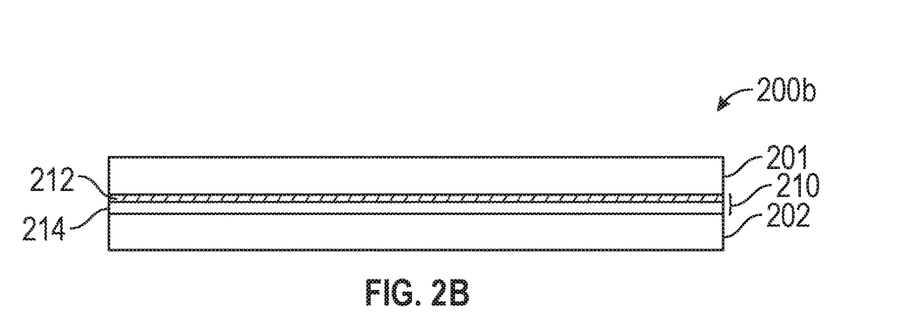

Referring now to FIG. 2B, membrane 200b comprises first ion-conductive polymer layers 201 and 202, which may be the same or different. Platinized nanostructured layer 210 comprises microstructured support 214 composed of close-packed whiskers (not shown) and platinum-containing catalyst layer 212.

Figure 2C:
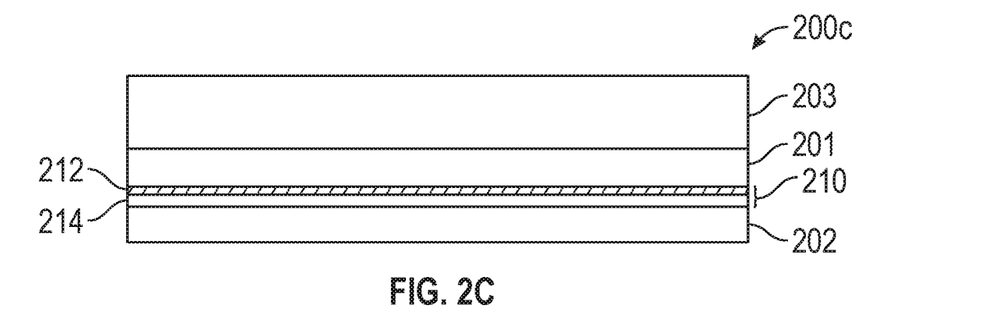

Referring now to FIG. 2C, membrane 200c comprises first ion-conductive polymer layers 201, 202, and 203, which may be the same or different. Platinized nanostructured layer 210 comprises microstructured support 214 composed of close-packed whiskers (not shown) and platinum-containing catalyst layer 212.

Figure 2D:
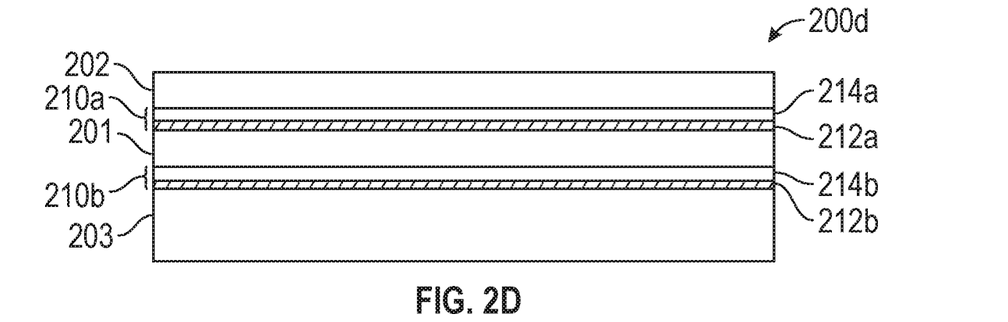

Referring now to FIG. 2D, membrane 200d comprises first ion-conductive polymer layers 201, 202, and 203, which may be the same or different. Platinized nanostructured layers 210a and 210b comprises respective microstructured supports 214a, 214b composed of close-packed whiskers (not shown) and platinum-containing catalyst layers 212a, 212b.

Figure 2E:
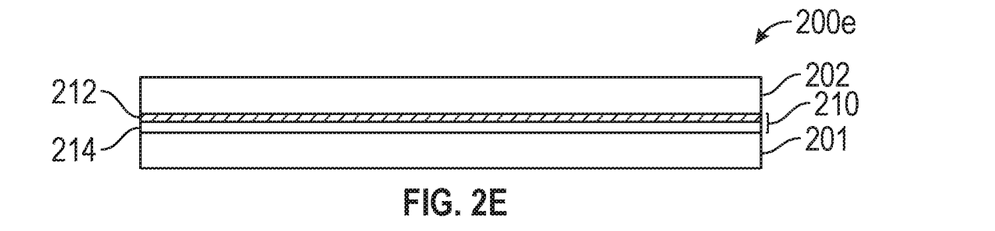
Figure 3A:
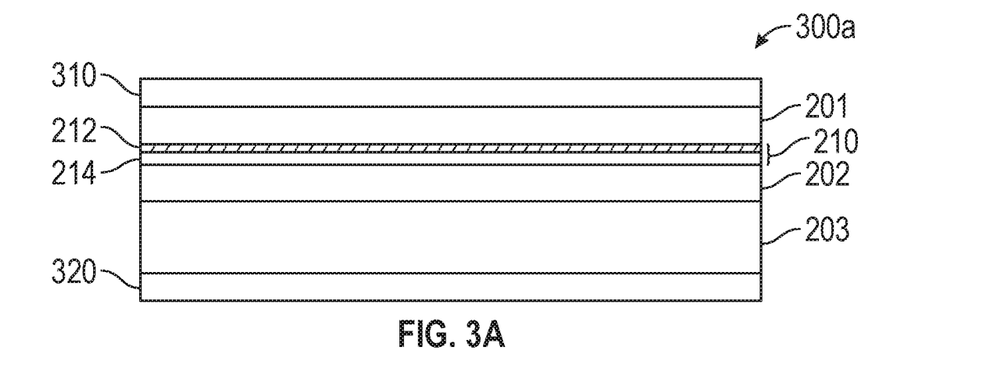
FIGS. 3A-3E are schematic side views of various membrane electrode assembly containing exemplary membranes 2A-2E, respectively.
Figure 3B:
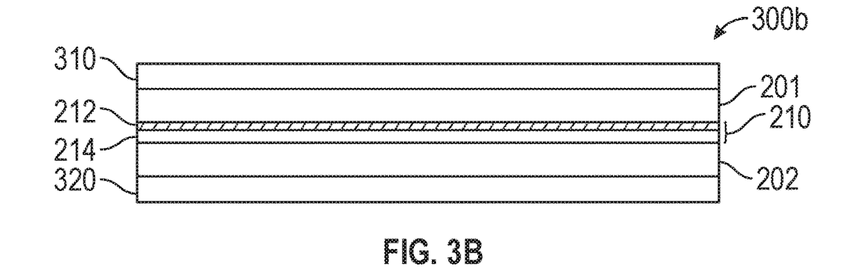
Figure 3C:
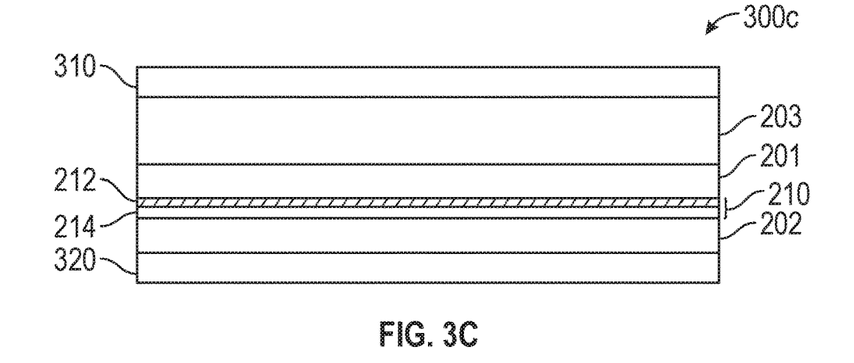
Figure 3D:
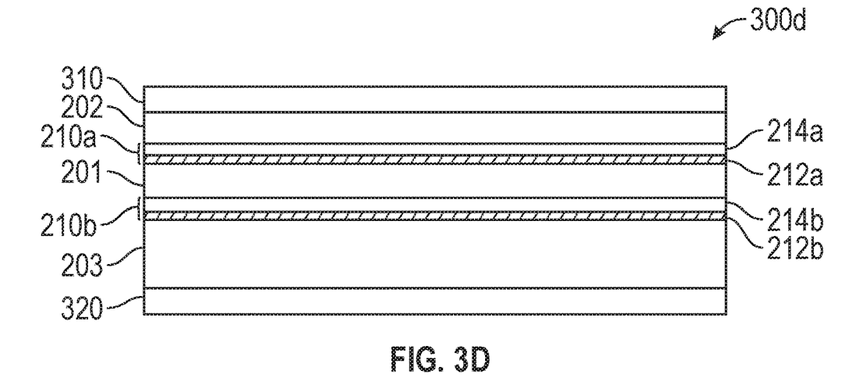
Figure 3E:
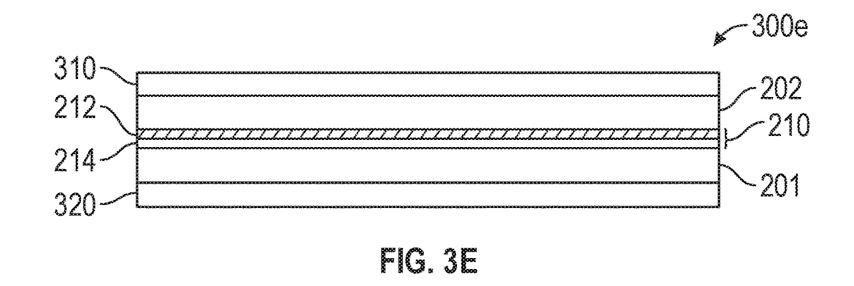

Referring now to FIG. 2E, membrane 200c comprises first ion-conductive polymer layers 201 and 202, which may be the same or different. Platinized nanostructured layer 210 comprises microstructured support 214 composed of close-packed whiskers (not shown) and platinum-containing catalyst layer 212.

The membranes may be incorporated into a membrane electrode assembly. FIGS. 3A-3E show membrane electrode assemblies incorporating membranes 2A-2E, respectively. In FIGS. 3A-3E, a cathode 310 and an anode 320 are affixed to and in contact with the membranes 2A-2E, respectively.

Cathode 120 has first catalyst consisting essentially of at least one of metallic Pt or Pt oxide (i.e., consists essentially of metallic Pt, consists essentially of Pt oxide, or consists essentially of both metallic Pt and Pt oxide). Anode 130 has second catalyst comprising at least 95 percent by weight of collectively metallic Ir and Ir oxide, calculated as elemental Ir, based on the total weight of the second catalyst, wherein at least one of metallic Ir or Ir oxide is present. As shown, cell 100 also includes optional first fluid transport layer (FTL) 135 adjacent anode 130, and optional second fluid transport layer 125 situated adjacent cathode 120. FTLs 125 and 135 can be referred to as diffuser/current collectors (DCCs) or gas diffusion layers (GDLs). In operation, water is introduced into the anode portion of cell 100, passing through first fluid transport layer 135 and over anode 130. Power source 140 applies an electrical current source on cell 100.

In some embodiments, membrane 110 is a proton exchange membrane (PEM) that preferentially permits hydrogen ions (solvated protons) to pass through the membrane to the cathode portion of the cell, thus conducting an electrical current through the membrane. The electrons cannot normally pass through the membrane and, instead, flow through an external electrical circuit in the form of electrical current.

The hydrogen ions ($H^{3o}$) combine with the electrons at cathode 120 to form hydrogen gas, and the hydrogen gas is collected through second fluid transport layer 125 situated adjacent cathode 120. Oxygen gas is collected at the anode of cell 100 via first fluid transport layer 135 situated adjacent anode 130.

Gas diffusion layer (GDL) 135 facilitates water and oxygen gas transport to and from the anode, respectively, and hydrogen ions (H+) and water (carried electro-osmotically through the PEM membrane with the solvated protons) transport from the anode through the membrane to the cathode, conducting electrical current. Also, some of the produced hydrogen gas transports through the membrane from the cathode to the anode by diffusion, resulting in undesired "hydrogen crossover." GDLs 125, 135 are both porous and electrically conductive, and on the cathode side are typically composed of either carbon fibers or titanium fibers or porous titanium frit. However, to avoid degradation of carbon at the high potentials of the anode, it is preferred to use a more corrosion resistant material, such as porous titanium, as the GDL on the anode. The GDL may also be called a fluid transport layer (FTL) or a diffuser/current collector (DCC). In some embodiments, the anode and cathode layers are applied to GDLs and the resulting catalyst-coated GDLs (also called CCBs, catalyst coating backings) are sandwiched with a polymer electrolyte such as a PEM to form a five-layer MEA. The five layers of such a five-layer MEA are, in order: anode GDL, anode layer, ion-conducting membrane, cathode layer, and cathode GDL. The anode layer and cathode layer typically comprise an anode catalyst and a cathode catalyst, respectively. In other embodiments, the anode and cathode layers are applied to either side of the ion-conducting membrane, and the resulting catalyst-coated membrane (CCM) is sandwiched between two GDLs (or FTLs) to form a five-layer MEA.

An ion-conducting membrane used in a CCM or MEA described herein may comprise any suitable polymer electrolyte(s). Exemplary polymer electrolytes typically bear anionic functional groups bound to a common backbone, which are typically sulfonic acid groups but may also include carboxylic acid groups, phosphonic acid groups, imide groups, imide acid groups, amide groups, or other acidic functional groups. Anion-conducting membranes comprising cationic functional groups bound to a common backbone are also possible but are less commonly used. Exemplary polymer electrolytes are typically highly fluorinated and most typically perfluorinated (e.g., at least one of a polymeric perfluorosulfonic acid and a polymeric perfluorosulfonimide). Exemplary polymer electrolytes include copolymers of tetrafluoroethylene and at least one fluorinated, acid-functional co-monomer. Typical polymer electrolytes include those available from DuPont Chemicals, Wilmington, Del., under the trade designation "NAFION"; from Solvay, Brussels, Belgium, under the trade designation "AQUIVION"; and from Asahi Glass Co. Ltd., Tokyo, Japan, under the trade designation "FLEMION". The polymer electrolyte may be a copolymer of tetrafluoroethylene (TFE) and $FSO_2$—$CF_2CF_2CF_2CF_2$—O—CF=$CF_2$, as described in U.S. Pat. No. 6,624,328 (Guerra) and U.S. Pat. No. 7,348,088 (Hamrock et al.), and U.S. Publ. No. 2004/0116742 (Guerra), the disclosures of which are incorporated herein by reference. After hydrolysis, the fluorosulfonyl group (—$O_2F$) is converted to a sulfonic acid group (—$SO_3H$). The polymer typically has an equivalent weight (EW) up to 1500 (in some embodiments, up to 1200, 1100, 1000, 900, 825, 800, 725, or even up to 625 grams per equivalent), although this is not a requirement.

The polymer electrolyte can be formed into a membrane or membrane layer by any suitable method. The polymer electrolyte is typically cast from a suspension. Any suitable casting method may be used, including bar coating, spray coating, slit coating, and brush coating. Alternately, neat polymer may be used in a melt process such as extrusion. After forming, the membrane or membrane layer may be annealed, typically at a temperature of at least 120° C. (in some embodiments, at least 130° C., 150° C., or higher). The membrane typically has a thickness up to 250 micrometers (in some embodiments, up to 225 micrometers, 200 micrometers, 175 micrometers, 150 micrometers, 100 micrometers, or even up to 50 micrometers).

The membrane or membrane layer can also include a support matrix consisting of a porous network of interlinked fibers that will provide the ion exchange polymer (ionomer) with additional mechanical strength to withstand the occasional large pressure differentials across the membrane due to the high pressure of the cathode side during hydrogen evolution. The support matrix can be made of an expanded polytetrafluoroethylene (e.g., that available under the trade designation "TEFLON" from DuPont Chemicals), or a partially fluorinated fibrous matrix that will be stable in the acidic environment of the ionomer.

The membrane comprises first and second membrane layers with a platinized nanostructured layer disposed (e.g., sandwiched) therebetween. The composition of the first and second membrane layers may be the same or different. Likewise, thickness, porosity, or other physical properties of the first and second membrane layers may be the same or different.

In some embodiments, the first membrane layer has a first proton conducting polymer reinforced with a first nanofiber mat. The first nanofiber mat is made from a nanofiber comprising a fiber material selected from polymers and polymer blends, wherein the fiber material has a fiber material proton conductivity, wherein the first proton conducting polymer has a first proton conducting polymer conductivity, and wherein the fiber material proton conductivity is less than the first proton conducting polymer conductivity.

In some embodiments, the second membrane layer has a second proton conducting polymer reinforced with a second nanofiber mat. The second nanofiber mat is made from a nanofiber comprising a fiber material selected from polymers and polymer blends, wherein the fiber material has a fiber material proton conductivity, wherein the second proton conducting polymer has a second proton conducting polymer conductivity, and wherein the fiber material proton conductivity is less than the second proton conducting polymer conductivity.

In some embodiments, the fiber material(s) in the membrane may include highly fluorinated polymer, perfluorinated polymer, hydrocarbon polymer, or blends and combinations thereof. In some embodiments, the fiber material in the membrane may include a polymer suitable for electrospinning selected from the group consisting of polyvinylidene fluoride (PVDF), polysulfone (PSU), polyethersulfone (PES), polyethylenimine (PEI), polybenzimidazole (PBI), poly(phenylene oxide) (PPO), polyetheretherketone (PEEK), polyphenyl ether (PPE), polyphenylene ether sulfone (PPES), polyetherketone (PEK), blends, and combinations thereof. In some embodiments, the fiber in the membrane may be an electrospun nanofiber.

Typically, it is desirable that the membrane be free of any Ce or Mn (i.e., no greater than 0.001 mg/cm$^3$ of either Ce or MN, calculated as elemental Ce and Mn, respectively).

Additional details for exemplary membranes can be found, for example, in U.S. Pat. Publ. Nos. 2008/0113242, 2002/0100725, and 2011/036935, the disclosures of which are incorporated herein by reference.

Optionally, the membrane is washed in acid (e.g., 1.0 molar nitric acid to remove any metal cation impurities, or nitric acid plus hydrogen peroxide to remove metal cation impurities and organic impurities, followed by rinsing in deionized water) prior to deposition or lamination of catalyst (including catalyst-bearing nanostructured whiskers) to remove cation impurities. Heating the washing bath (e.g., to 30° C., 40° C., 50° C., 60° C., 70° C., or even 80° C.) may make the cleaning faster. Benefits of acid washing the membrane may depend on the particular membrane.

The membrane may comprise, consist essentially of, or even consist of, a platinized nanostructured layer disposed between the first layer and the second layer, wherein the platinized nanostructured layer comprises substantially close-packed nanostructured whiskers (e.g., perylene red whiskers) having at least one of platinum or platinum oxide disposed thereon. Typically, the close-packed nanostructured whiskers are aligned substantially in the thickness direction of the membrane.

The space between the close-packed nanostructured whiskers may consist essentially of void space, may comprise ionomer with essentially no void space, or may comprise ionomer and void space. Without wishing to be bound by theory, void space may enable increased reactivity of the $H_2$ and $O_2$ with the platinized surface, due to higher collision frequency and higher transport rates of the $H_2$ and $O_2$ with the surface in void space than through a condensed phase. The fraction of the space between the close-packed nanostructured whiskers which is ionomer may depend upon the depth of penetration of the close-packed nanostructured whiskers into the membrane, which may be tailored by fabrication conditions. The fraction of the space between the close-packed nanostructured whiskers which comprises ionomer may be in a range from 1 to 99% (in some embodiments, in a range from 5 to 95%, 10 to 90%, 20 to 80%, 30 to 70%, or even 40 to 60%).

Nanostructured whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, nanostructured whiskers can be provided, for example, by vacuum depositing (e.g., by sublimation) a layer of organic or inorganic material such as perylene red onto a substrate (e.g., a microstructured catalyst transfer polymer), and then converting the perylene red pigment into nanostructured whiskers by thermal annealing.

Typically, the vacuum deposition steps are carried out at total pressures at or below about 10-3 Ton or 0.1 Pascal. Exemplary microstructures are made by thermal sublimation and vacuum annealing of the organic pigment "perylene red," C.I. Pigment Red 149 (i.e., N,N'-di(3,5-xyly)perylene-3,4:9,10-bis(dicarboximide)). Methods for making organic nanostructured layers are disclosed, for example, in *Materials Science and Engineering*, A158 (1992), pp. 1-6; 1 *J. Voc. Sci. Technol. A*, 5 (4), July/August, 1987, pp. 1914-16; *J. Voc. Sci. Technol. A*, 6, (3), May/August, 1988, pp. 1907-11; Thin Solid Films, 186, 1990, pp. 327-47; *J. Mat. Sci.*, 25, 1990, pp. 5257-68; Rapidly Quenched Metals, *Proc. of the Fifth Int. Conf. on Rapidly Quenched Metals*, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August, 1980, pp. 211-16; and U.S. Pat. No. 4,340,276 (Muffin et al.) and U.S. Pat. No. 4,568,598 (Bilkadi et al.), the disclosures of which are incorporated herein by reference. Properties of catalyst layers using carbon nanotube arrays are disclosed in the article "High Dispersion and Electrocatalytic Properties of Platinum on Well-Aligned Carbon Nanotube Arrays," *Carbon*, 42, (2004), 191-197. Properties of catalyst layers using grassy or bristled silicon are disclosed in U.S. Pat. App. Pub. No. 2004/0048466 A1 (Gore et al.).

Figure 4:
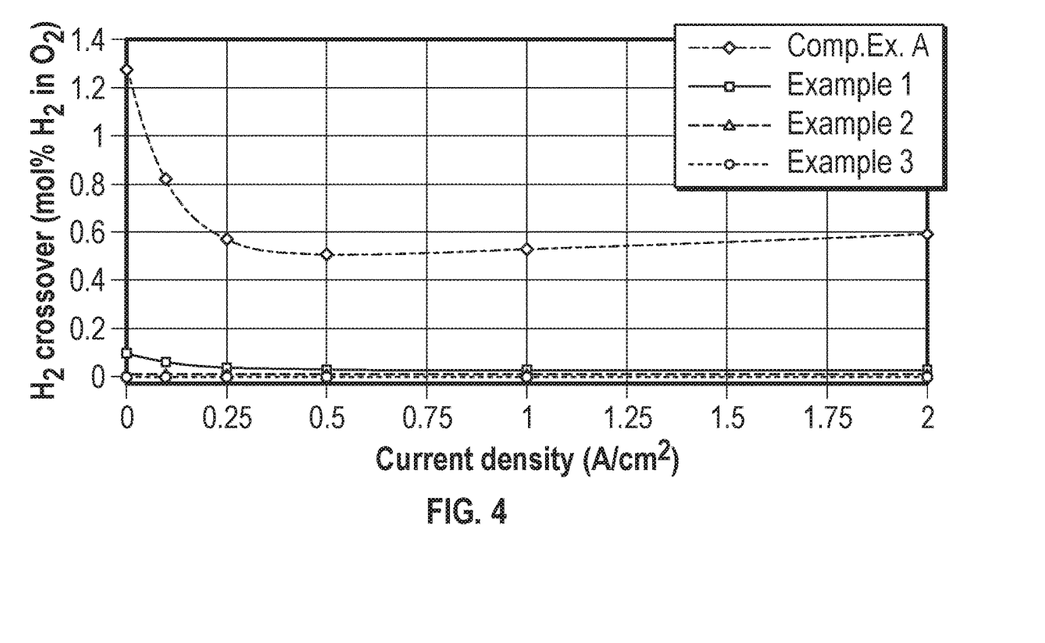
FIG. 4 is a plot of $H_2$ mol % in $O_2$ of the CCM of Example 1, the CCM of Example 2, and the CCM of Example 3 as a function of current density.
Figure 5:
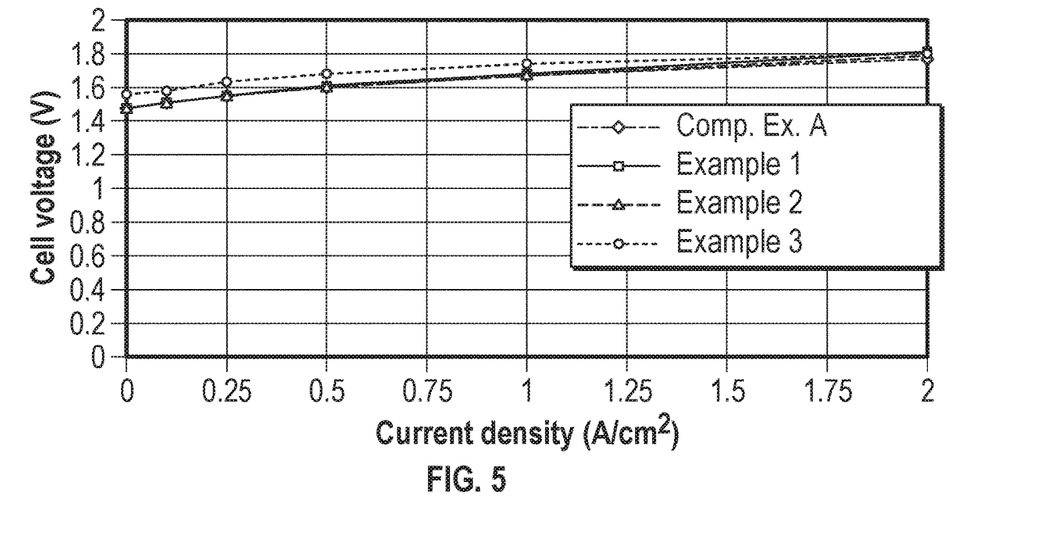
FIG. 5 is a plot of Cell Voltage and $H_2$ mol % in $O_2$ of the CCM of Example 1, the CCM of Example 2, and the CCM of Example 3 as a function of current density.
Figure 6:
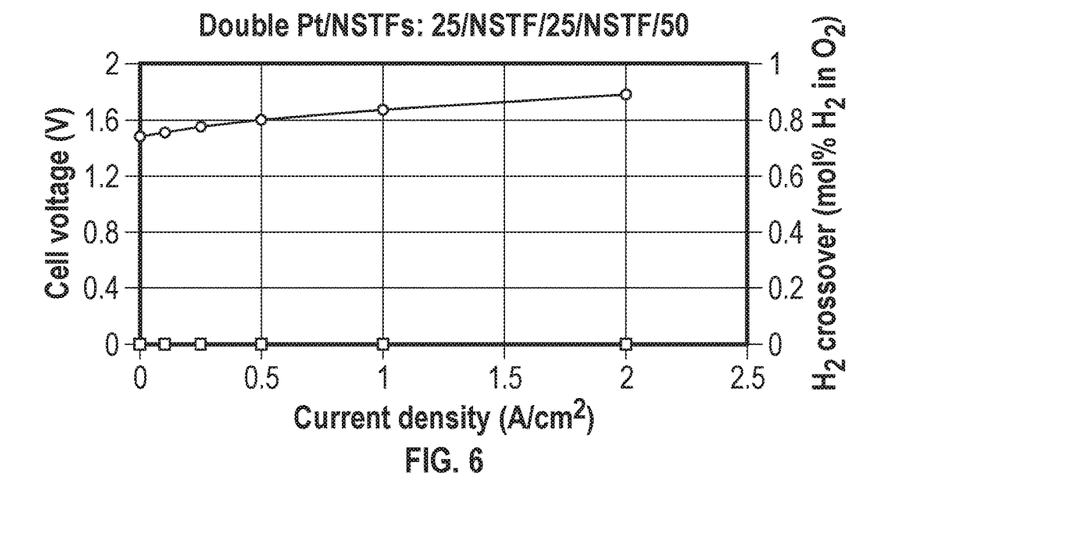
FIG. 6 is a plot of Cell Voltage and $H_2$ mol % in $O_2$ of the CCM of Example 4 as a function of current density.
Figure 7:
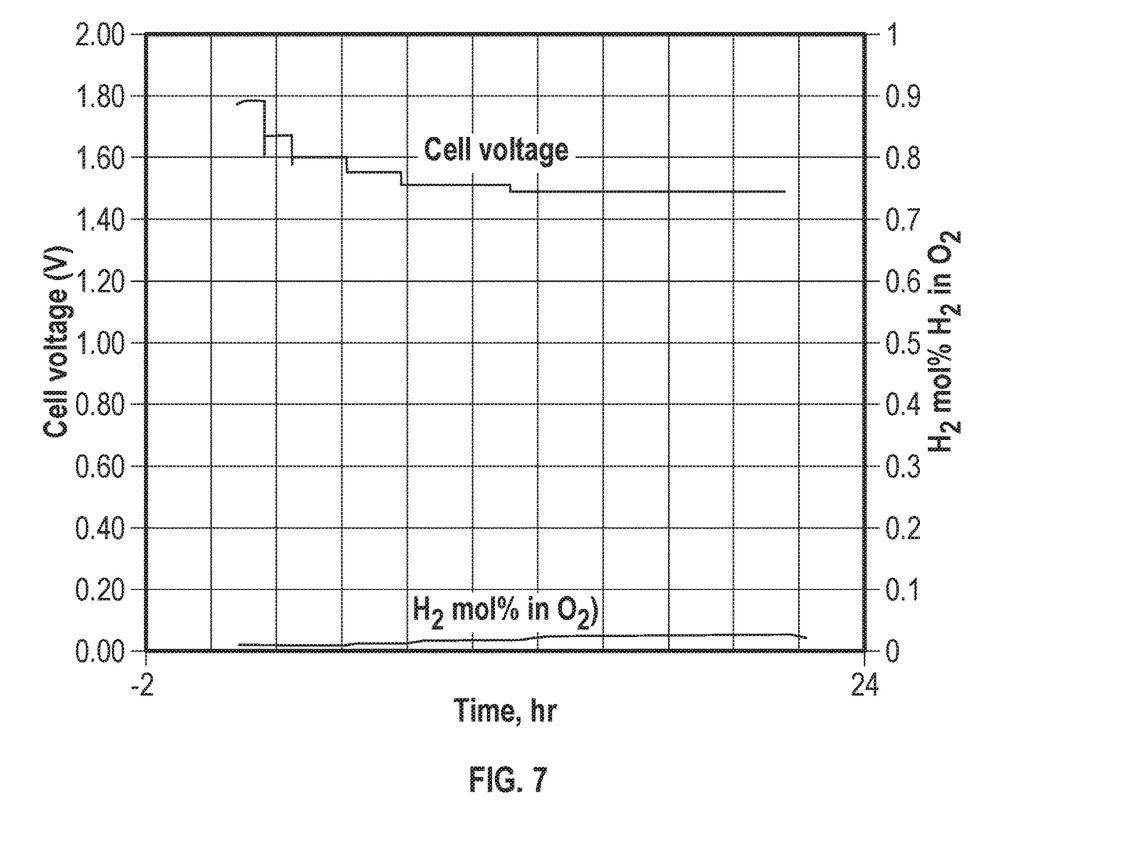
FIG. 7 is a plot of Cell Voltage and $H_2$ mol % in $O_2$ of the CCM of Example 5 as a function of time.

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum that is then rotated over a sublimation or evaporation source for depositing perylene red pigment as a layer. After deposition, and before or after deposition of the platinum-containing catalyst, thermal annealing of the perylene red pigment causes formation of perylene red whiskers that create nanostructured texture in the catalyst layer.

Typically, the nominal thickness of deposited perylene red pigment is in a range from about 50 nm to 500 nm. Typically, the whiskers have an average cross-sectional dimension in a range from 20 nm to 60 nm and an average length in a range from 0.3 micrometer to 3 micrometers.

In some embodiments, the backing has a microstructure on at least one of its surfaces. In some embodiments, the microstructure is comprised of substantially uniformly shaped and sized features at least three (in some embodiments, at least four, five, ten or more) times the average size of the nanostructured whiskers. The shapes of the microstructures can, for example, be V-shaped grooves and peaks (e.g., see U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference).

In some embodiments, some fraction of the features of the microstructures extend above the average or majority of the microstructured peaks in a periodic fashion, such as every 31st V-groove peak is 25% or 50% or even 100% taller than those on either side of it. In some embodiments, this fraction of features that extend above the majority of the microstructured peaks can be up to 10% (in some embodiments up to 3%, 2%, or even up to 1%).

Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures and so much less of the nanostructured material or whiskers is likely to be scraped or otherwise disturbed as the substrate moves through the coating process. In some embodiments, the nanostructured whiskers are at least partially embedded in the ion-conducting membrane. In some embodiments, the microstructure features are substantially smaller than half the thickness of the membrane that the catalyst will be transferred to in making a membrane electrode assembly (MEA). This is so that during the catalyst transfer process, the taller microstructure features do not penetrate through the membrane where they may overlap the electrode on the opposite side of the membrane. In some embodiments, the tallest microstructure features are less than ⅓rd or ¼th of the membrane thickness. For the thinnest ion exchange membranes (e.g., about 10 to 15 micrometers in thickness), it may be desirable to have a backing with microstructured features no larger than about 3 to 4.5 micrometers tall. The steepness of the sides of the V-shaped or other microstructured features or the included angles between adjacent features in some embodiments may be desirable to be on the order of 90° for ease in catalyst transfer during a lamination-transfer process and in order to have a gain in surface area of the electrode that comes from the square root of two (1.414) surface area of the microstructured layer relative to the planar geometric surface of the backing.

Once the close-packed layer of nanostructured whiskers has been formed on the backing it may be coated with platinum and/or platinum oxide; for example, using vapor deposition methods well known in the art. Platinum and/or platinum oxide can be sputtered onto the nanostructured whiskers, for example, using the general teachings in U.S. Pat. No. 5,879,827 (Debe et al.), U.S. Pat. No. 6,040,077 (Debe et al.), and U.S. Pat. No. 7,419,741 (Vernstrom et al.), and U.S. Pat. Pub. No. 2014/0246304 A1 (Debe et al.), the disclosures of which are incorporated herein by reference. In some embodiments, sputtering is conducted at least in part in an atmosphere comprising argon that is flowing into the sputtering chamber at a rate of at least 120 sccm (i.e., standard cubic centimeters per minute).

In some embodiments, the at least one of metallic Pt or Pt oxide is collectively present in the membrane at a concentration in a range from 0.05 mg/cm$^3$ to 100 mg/cm$^3$ (in some embodiments, in a range from 0.1 mg/cm$^3$ to 100 mg/cm$^3$, 1 mg/cm$^3$ to 75 mg/cm$^3$, or even 5 mg/cm$^3$ to 50 mg/cm$^3$).

Once platinized, the platinized nanostructured layer may be transferred from the backing to the first membrane layer by heat and/or pressure lamination followed by removal of the backing (e.g., by peeling). Further heat and/or or pressure lamination of the newly exposed surface of the platinized nanostructured layer to the second membrane layer may result in a construction in which the platinized nanostructured layer is disposed between the first and second membrane layers to form a dimensionally stable membrane.

In making an MEA, GDLs may be applied to either side of a CCM. The GDLs may be applied by any suitable means. Suitable GDLs include those stable at the electrode potentials of use. For example, the cathode GDL can contain particulate carbon black or carbon fibers since it is operated at low potentials sufficient for adequate hydrogen evolution, whereas the anode GDL is typically made of Ti or some other material stable at the high potentials characteristic of oxygen evolution. Typically, the cathode GDL is a carbon fiber construction of woven or non-woven carbon fibers. Exemplary carbon fiber constructions include those available, for example, under the trade designation "TORAY" (carbon paper) from Toray, Japan; "SPECTRACARB" (carbon paper) from Spectracarb, Lawrence, Mass.; and "ZOLTEK" (carbon cloth) from Zoltek, St. Louis, Miss., as well as from Mitsubishi Rayon Co., Japan, and Freudenberg, Germany. The GDL may be coated or impregnated with various materials, including carbon particle coatings, hydrophilizing treatments, and hydrophobizing treatments such as coating with polytetrafluoroethylene (PTFE).

Typically, the electrolyzer anode GDL is metal foam or porous metal screen or mesh comprised, for example, of Pt, Ti, Ta, Nb, Zr, Hf, or a metal alloy that will not corrode (e.g., Ti-10V-5Zr) and yet will have adequate electrical conductivity (e.g., by sputter deposition or electroplating a layer of Pt onto the surface in the case of a Ti GDL) for the electrolyzer operation at the potentials of use above the thermodynamic potential for water oxidation at 1.23 V.

In use, MEAs described herein are typically sandwiched between two rigid plates, known as distribution plates, also known as end plates (or in case of a multi-cell stack, bipolar plates (BPPs)). Like the GDL, the distribution plates are electrically conductive and must be stable at the potentials of the electrode GDL against which it is placed. The distribution plate is typically made of materials such as carbon composite, metal, or coated or plated metals. As for the GDLs, the cathode plate of the electrolyzer can be any material common to use in fuel cells, whereas the anode plate of the electrolyzer must be fabricated of a material that will not substantially corrode above at potentials of 1.23 volt (in some embodiments, up to 1.5 volt, 2.5 volts, or even higher) relative to the potential of a reversible hydrogen electrode (RHE). An exemplary coating for the anode plate comprises Ti-10V-5Zr. The distribution plate distributes reactant or product fluids to and from the MEA electrode surfaces, typically through at least one fluid-conducting channel engraved, milled, molded, or stamped in the surface(s) facing the MEA(s). These channels are sometimes designated a flow field. The distribution plate may distribute fluids to and from two consecutive MEAs in a stack, with one face directing water to and oxygen from the anode of the first MEA while the other face directs evolved hydrogen and water (that crosses over the membrane) away from the cathode of the next MEA. Alternately, the distribution plate may have channels on one side only, to distribute fluids to or from an MEA on only that side, in which case the distribution plate may be termed an "end plate."

The anode and cathode can be provided by techniques known in the art, including those described in PCT Pub. No. WO 2016/191057 A1, published Dec. 1, 2016, the disclosure of which is incorporated herein by reference. In general, the anode and cathode are each comprised of layers.

In some embodiments, the second catalyst consists essentially of at least one of metallic Ir or Ir oxide (i.e., consists essentially of metallic Ir, consists essentially of Ir oxide, or consists essentially of both metallic Ir and Ir oxide). In some embodiments, the second catalyst further comprises at least one of metallic Pt or Pt oxide. In some embodiments, the second catalyst consists essentially of at least one of metallic Pt or Pt oxide and at least one of metallic Ir or Ir oxide.

For catalysts comprising or consisting essentially of at least one of metallic Ir or Ir oxide and at least one of metallic Pt or Pt oxide, the iridium and platinum, calculated as elemental Pt and Ir, respectively, have a collective weight ratio of at least 20:1 (in some embodiments, at least 50:1, 100:1, 500:1, 1000:1, 5,000:1, or even at least 10,000:1; in some embodiments, in a range from 20:1 to 10,000:1, 20:1 to 5,000:1, 20:1 to 1000:1, 20:1 to 500:1, 20:1 to 100:1, or even 20:1 to 50:1) Ir to Pt.

In some embodiments, the at least one of metallic Ir or Ir oxide of the second catalyst collectively has an areal density of at least 0.01 mg/cm$_2$ (in some embodiments, at least 0.05 mg/cm$^2$, 0.1 mg/cm$^2$, 0.25 mg/cm$^2$, 0.5 mg/cm$^2$, 1 mg/cm$^2$, or even at least 5 mg/cm$^2$; in some embodiments, in a range from 0.01 mg/cm$^2$ to 5 mg/cm$^2$, 0.05 mg/cm$^2$ to 2.5 mg/cm$^2$, 0.1 mg/cm$^2$ to 1 mg/cm$^2$, or even 0.25 mg/cm$^2$ to 0.75 mg/cm$^2$).

Typically, the planar equivalent thickness of a catalyst layer is in a range from 0.5 nm to 5 nm. "Planar equivalent thickness" means, in regard to a layer distributed on a surface, which may be distributed unevenly, and which surface may be an uneven surface (such as a layer of snow distributed across a landscape, or a layer of atoms distributed in a process of vacuum deposition), a thickness calculated on the assumption that the total mass of the layer was spread evenly over a plane covering the same projected area as the surface (noting that the projected area covered by the surface is less than or equal to the total surface area of the surface, once uneven features and convolutions are ignored).

In some embodiments, the anode catalyst comprises up to 1 mg/cm$^2$ (in some embodiments, up to 0.25 mg/cm$^2$, or even up to 0.025 mg/cm$^2$) of the at least one of metallic Ir or Ir oxide, calculated as elemental Ir. In some embodiments, the cathode catalyst comprises up to 1 mg/cm$^2$ (in some embodiments, up to 0.25 mg/cm$^2$, or even up to 0.025 mg/cm$^2$) of the at least one of metallic Pt or Pt oxide, calculated as elemental Pt. Typically, the catalyst is a continuous layer on each whisker and may form a bridge to adjacent whiskers.

In some embodiments where catalyst is coated on nanostructured whiskers (including perylene red nanostructured whiskers), the catalyst is coated in-line, in a vacuum, immediately following the nanostructured whisker growth step on the microstructured substrate. This may be a more cost-effective process so that the nanostructured whisker coated substrate does not need to be re-inserted into the vacuum for catalyst coating at another time or place. If the Ir catalyst coating is done with a single target, it may be desirable that the coating layer be applied in a single step onto the nanostructured whiskers so that the heat of condensation of the catalyst coating heats the Ir, O, etc. atoms and substrate surface sufficiently to provide enough surface mobility that the atoms are well mixed and form thermodynamically stable domains. If the Pt catalyst coating is done with a single target, it may be desirable that the coating layer be applied in a single step onto the nanostructured whiskers so that the heat of condensation of the catalyst coating heats the Pt, O, etc. atoms and substrate surface sufficiently to provide enough surface mobility that the atoms are well mixed and form thermodynamically stable domains. Alternatively, for perylene red nanostructured whiskers, the substrate can also be provided hot or heated to facilitate this atomic mobility, such as by having the nanostructured whisker coated substrate exit the perylene red annealing oven immediately prior to the catalyst sputter deposition step.

It will be understood by one skilled in the art that the crystalline and morphological structure of a catalyst described herein, including the presence, absence, or size of alloys, amorphous zones, crystalline zones of one or a variety of structural types, and the like, may be highly dependent upon process and manufacturing conditions, particularly when three or more elements are combined.

Water electrolyzers described herein are useful for generating hydrogen and oxygen from water, wherein water is in contact with the anode, and an electrical current is provided through the membrane with sufficient potential difference across the membrane to convert at least a portion of the water to hydrogen and oxygen on the cathode and anode, respectively.

SELECT EMBODIMENTS OF THE PRESENT DISCLOSURE

In a first embodiment, the present disclosure provides a water electrolyzer comprising:
a membrane having first and second opposed major surfaces and comprising:
a first membrane layer comprising a first ion-conductive polymer;
a second membrane layer comprising a second ion-conductive polymer; and
a platinized nanostructured layer disposed between the first layer and the second layer, wherein the platinized nanostructured layer comprises close-packed whiskers having at least one of platinum or platinum oxide disposed thereon;
a cathode disposed on the first major surface of the membrane, the cathode comprising a first catalyst consisting essentially of either or both of metallic Pt and Pt oxide; and
an anode disposed on the second major surface of the membrane, the anode comprising a second catalyst, the second catalyst comprising at least 95 percent by weight of collectively metallic Ir and Ir oxide, calculated as elemental Ir, based on the total weight of the second catalyst, wherein at least one of metallic Ir or Ir oxide is present.

In a second embodiment, the present disclosure provides a water electrolyzer according to the first embodiment, wherein the second platinized nanostructured layer has a thickness of 0.05 micrometer to 0.5 micrometer.

In a third embodiment, the present disclosure provides a water electrolyzer according to the first or second embodiment, wherein the membrane further comprises:
a third membrane layer comprising a third ion-conductive polymer; and
a second catalyst layer disposed between the second layer and the third layer.

In a fourth embodiment, the present disclosure provides a water electrolyzer according to the third embodiment, wherein the second platinized nanostructured layer has a thickness of 0.05 micrometer to 0.5 micrometer.

In a fifth embodiment, the present disclosure provides a water electrolyzer according to the third or fourth embodiment, wherein at least one of the first or second platinized nanostructured layers comprises close-packed whiskers having at least one of platinum or platinum oxide disposed thereon.

In a sixth embodiment, the present disclosure provides a water electrolyzer according to the fifth embodiment, wherein at least some of the close-packed whiskers are separated from each other by void space.

In a seventh embodiment, the present disclosure provides a water electrolyzer according to the sixth or seventh embodiments, wherein at least some of the whiskers comprise perylene red.

In an eighth embodiment, the present disclosure provides a water electrolyzer according to any one of the first to seventh embodiments, wherein the first or second membrane layer is a composite layer.

In ninth embodiment, the present disclosure provides a water electrolyzer according to any one of the first to eighth embodiments, wherein the second catalyst consists essentially of at least one of metallic Ir or Ir oxide.

In a tenth embodiment, the present disclosure provides a water electrolyzer according to any one of the first to ninth embodiments, wherein the second catalyst further comprises at least one of metallic Pt or Pt oxide.

In an eleventh embodiment, the present disclosure provides a water electrolyzer according to any one of the ninth or tenth embodiments, wherein the second catalyst consists essentially of at least one of metallic Pt or Pt oxide and at least one of metallic Ir or Ir oxide.

In a twelfth embodiment, the present disclosure provides a water electrolyzer according to the eleventh embodiment, wherein the at least one of metallic Ir or Ir oxide and at least one of metallic Pt or Pt oxide have a collective weight ratio, calculated as elemental Ir and Pt, respectively, of at least 20:1 Ir to Pt.

In a thirteenth embodiment, the present disclosure provides a water electrolyzer according to any one of the first to twelfth embodiments, wherein the at least one of metallic Ir or Ir oxide of the second catalyst collectively has an areal density of at least 0.01 mg/cm$^2$.

In a fourteenth embodiment, the present disclosure provides a water electrolyzer according to the thirteenth embodiment, wherein the membrane further comprises polymer electrolyte.

In a fifteenth embodiment, the present disclosure provides a water electrolyzer according to any one of the first to fourteenth embodiments, wherein the polymer electrolyte is at least one of a perfluorosulfonic acid, perfluorosulfonimide, or a perfluorosulfonimide sulfonic acid.

In a sixteenth embodiment, the present disclosure provides a water electrolyzer according to any one of the first to fifteenth embodiments, wherein the at least one of metallic Pt or Pt oxide is collectively present in the membrane at a concentration in a range from 0.05 mg/cm$^3$ to 100 mg/cm$^3$.

In a seventeenth embodiment, the present disclosure provides a water electrolyzer according to any one of the first to sixteenth embodiments, wherein the at least one of metallic Pt or Pt oxide is distributed throughout the membrane.

In an eighteenth embodiment, the present disclosure provides a method of generating hydrogen and oxygen from water, the method comprising:
providing a water electrolyzer according to the first or second embodiment;
providing water in contact with the anode; and
providing an electrical current with sufficient potential difference across the membrane to convert at least a portion of the water to hydrogen and oxygen on the cathode and anode, respectively.

In a nineteenth embodiment, the present disclosure provides a method of generating hydrogen and oxygen from water, the method comprising:
providing a water electrolyzer according to any one of the third to sixteenth embodiments;
providing water in contact with the anode; and
providing an electrical current with sufficient potential difference across the membrane to convert at least a portion of the water to hydrogen and oxygen on the cathode and anode, respectively.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Materials 1. 825EW POWDER polymeric perfluorosulfonic acid ion exchange resin from 3M Company dispersed at 34 wt. % in a 70:30 w/w mix of ethanol and water.
2. PFSA 825 EW 50 μm-thick membrane prepared generally according to the procedure in U.S. Pat. No. 7,348,088 (Hamrock et al.).
3. 0.05 mg/cm$^2$ Pt-NSTF, 0.25 mg/cm$^2$ Pt-NSTF, and 0.5 mg/cm$^2$ Ir-NSTF prepared generally according to the procedure in U.S. Pat. No. 6,136,412 (Spiewak et al.).

Preparation of Nanostructured Whiskers

Nanostructured whiskers were prepared by thermally annealing a layer of perylene red pigment (PR 149), which was sublimation vacuum coated onto microstructured catalyst transfer polymer substrates (MCTS) with a nominal thickness of 200 nm, as described in detail in U.S. Pat. No. 4,812,352 (Debe), the disclosure of which is incorporated herein by reference. A roll-good web of the MCTS (made on a polyimide film ("KAPTON")) was used as the substrate on which the PR149 was deposited. The MCTS substrate surface had V-shaped features with about 3 micrometer tall peaks, spaced 6 micrometers apart. A nominally 100 nm thick layer of Cr was then sputter deposited onto the MCTS surface using a DC magnetron planar sputtering target and typical 10 background pressures of Ar and target powers known to those skilled in the art sufficient to deposit the Cr in a single pass of the MCTS web under the target at the desired web speed.

The Cr coated MCTS web then continued over a sublimation source containing the perylene red pigment (PR 149). The perylene red pigment (PR 149) was heated to a controlled temperature near 500° C. so as to generate sufficient vapor pressure flux to deposit 0.022 mg/cm$^2$, or an approximately 220 nm thick layer of the perylene red pigment (PR 149) in a single pass of the web over the sublimation source. The mass or thickness deposition rate of the sublimation can be measured in any suitable fashion known to those skilled in the art, including optical methods sensitive to film thickness, or quartz crystal oscillator devices sensitive to mass. The perylene red pigment (PR 149) coating was then converted to the whisker phase by thermal annealing, as described in detail in U.S. Pat. No. 5,039,561 (Debe), the disclosure of which is incorporated herein by reference, by passing the perylene red pigment (PR 149) coated web through a vacuum having a temperature distribution sufficient to convert the perylene red pigment (PR 149) as-deposited layer into a layer of oriented crystalline whiskers at the desired web speed, such that the whisker layer has an average whisker areal number density of 68 whiskers per square micrometer, determined from scanning electron microscopy (SEM) images, with an average 25 length of 0.6 micrometer.

Preparation of Nanostructured Thin Film (NSTF) Catalyst

Nanostructured thin film (NSTF) Ir-based catalyst was prepared by sputter coating Ir catalyst films onto the layer of nanostructured whiskers (prepared as described above under the heading "Preparation of Nanostructured Whiskers").

Nanostructured thin film (NSTF) catalyst layers were prepared by sputter coating catalyst films using a DC-magnetron sputtering process onto the layer of nanostructured whiskers. A roll-good of nanostructured whiskers on MCTS substrate were loaded into a vacuum sputter deposition system similar to that described in FIG. 4A of U.S. Pat. No. 5,338,430 (Parsonage et al.), but equipped with additional capability to allow coatings on roll-good substrate webs. The coatings were sputter deposited by using ultra high purity Ar as the sputtering gas at approximately 5 mTorr (0.65 Pa) pressure. Ir-NSTF catalyst layers were deposited onto the roll-good by first exposing all sections of the roll-good substrate to an energized 5 inch×15 inch (13 cm×38 cm) planar Ir sputtering target (obtained from Materion, Clifton, N.J.), resulting in the deposition of Ir onto the substrate. The magnetron sputtering target deposition rate and web speed were controlled to give the desired areal loading of Ir on the substrate. The DC magnetron sputtering target deposition rate and web speed were measured by standard methods known to those skilled in the art. The substrate was repeatedly exposed to the energized Ir sputtering target, resulting in additional deposition of Ir onto the substrate, until the desired Ir areal loading was obtained. An analogous process was used for formation of Pt-NSTF catalyst layers, but a pure 5 inch×15 inch (13 cm×38 cm) planar Pt sputter target (obtained from Materion) was used in place of Ir.

Preparation of Catalyst-Coated Membrane (CCM)

A catalyst-coated-membrane (CCM) was made by transferring catalyst-coated whiskers described above onto both surfaces (full CCM) of the proton exchange membrane (PEM) ("NAFION 117") using the processes as described in detail in U.S. Pat. No. 5,879,827 (Debe et al.). A Pt-NSTF catalyst layer was laminated to one side (intended to become the cathode side) of the PEM, and an Ir-NSTF catalyst layer was laminated to the other (anode) side of the PEM. The catalyst transfer was accomplished by hot roll lamination of the NSTF catalysts onto the PEM: the hot roll temperatures were 350° F. (177° C.) and the gas line pressure fed to force laminator rolls together at the nip ranged from 150 psi to180 psi (1.03 MPa to 1.24 MPa). The catalyst coated MCTSs were precut into 13.5 cm×13.5 cm square shapes and sandwiched onto (one or) both side(s) of a larger square of PEM. The PEM with catalyst coated MCTS on one or both side(s), was placed between 2 mil (51 micrometer) thick polyimide film and then placed, paper on the outside, prior to passing the stacked assembly through the nip of the hot roll laminator at a speed of 1.2 ft./min. (37 cm/min.). Immediately after passing through the nip, while the assembly was still warm, the layers of polyimide and paper were quickly removed and the Cr-coated MCTS substrates were peeled off the CCM by hand, leaving the catalyst coated whiskers stuck to the PEM surface(s).

Full CCM Test Method

A full CCM fabricated as described above was tested in an $H_2/O_2$ electrolyzer single cell. The full CCM was installed with appropriate gas diffusion layers directly into a 50 cm2 single fuel cell test station (obtained under the trade designation "50SCH" from Fuel Cell Technologies, Albuquerque, N. Mex.), with quad serpentine flow fields. The normal graphite flow field block on the anode side was replaced with a Pt plated Ti flow field block of the same dimensions and flow field design (obtained from Giner, Inc., Auburndale, Mass.) to withstand the high anode potentials during electrolyzer operation. Purified water with a resistivity of 18 MΩ was supplied to the anode at 75 mL/min. A potentiostat (obtained under the trade designation "VMP-3, Model VMP-3" from Bio-Logic Science Instruments SAS, Seyssinet-Pariset, France) coupled with a 100A/5V booster (obtained as VMP 300 from Bio-Logic Science Instruments SAS) was connected to the cell and was used to control the applied cell voltage or current density.

The anode output was connected to a gas chromatograph (obtained under the trade designation "MICRO490," Model 490 Micro GC from Agilent, Santa Clara, Calif.) for analysis of the output gas for hydrogen content. All tests were carried out at a temperature of 80° C. with deionized water (18 MΩ·cm) flowing at a rate of 75 mL/min to the anode. The gas composition at the anode compartment was measured using gas chromatography. Under ambient pressure condition (i.e., 1 bar (0.1 MPa) at the cathode compartment and 1 bar (0.1 MPa) at the anode compartment), the level of $H_2$ crossover through each membrane to the anode was measured by measuring the mole percent of $H_2$ in $O_2$ at 80° C., varying current densities ranging from 2.0 to 0.05 A/cm².

Hydrogen Crossover and Cell Performance Test Method

The levels of hydrogen crossover and cell performance (e.g., by means of a polarization curve) of CCMs were determined according to the Full CCM Test Method (above). All tests were carried out at a temperature of 80° C. with DI water (18 MΩ·cm) flowing at a rate of 75 mL/min to the anode. The gas composition at the anode compartment was measured using gas chromatography (Agilent Technologies 490 MicroGC). Polarization curves (i.e., voltage-current density plots) were obtained using a Biologic VMP3 EIS capable potentiostat. The instruments and equipment setups used for the measurements are summarized as follows: (1) Biologic VMP3 EIS capable potentiostat with VMP3B-100 100A booster, (2) Agilent 490 MicroGC gas chromatograph with Molecular Sieve 5A column, (3) Ismatec Dispensing pump with RH1CKC 100 mL/min pump head, (4) Love 16A temperature controller, and (5) Fuel Cell Technologies 50 cm² quad serpentine with a modified anode flow field test cell.

COMPARATIVE EXAMPLE A

Comparative Example A was a perfluorinated sulfonic acid membrane having a nominal equivalent weight of 825 g/eq, available as 825EW IONOMER from 3M Company.

EXAMPLE 1

Two 25 μm-thick PFSA 825EW film (201, 202) and a 50 μm-thick PFSA 825EW film (203) were dried at 100° C. for 2 min under nitrogen prior to lamination. The dried 25 μm-thick PFSA 825EW film (202) and 50 μm-thick PFSA 825EW film (203) were laminated together at 350° F. (177° C.), 150 psi (1.03 kPa) and 0.5 fpm (15 cm/s). One 0.25 mg/cm² Pt/NSTF layer (210) was decal-transferred, as described in the Preparation of Catalyst-Coated Membrane (CCM) onto the opposite surface of the dried 25 μm-thick PFSA film (202). Then, as-prepared 25 μm-thick PFSA 825EW film (201) was laminated onto the other side of the Pt/NSTF layer (210). The resultant membrane had the construction shown in FIG. 2A.

EXAMPLE 2

Two 50 μm-thick PFSA 825EW films (201, 202) were dried at 100° C. for 2 min under nitrogen prior to lamination. One 0.25 mg/cm² Pt/NSTF layer (210) was decal-transferred, as described in the Preparation of Catalyst-Coated Membrane (CCM) onto one surface of dried 50 μm-thick PFSA membranes (201). Then, the other 50 μm-thick PFSA 825EW film (202) was laminated onto the exposed side of the Pt/NSTF layer (210) The resultant membrane had the construction shown in FIG. 2B.

EXAMPLE 3

Two 25 μm-thick PFSA 825EW films (201, 202) and a 50 μm-thick PFSA 825EW film (203) were dried at 100° C. for 2 min under nitrogen prior to lamination. One dried 25 μm-thick PFSA 825EW film (202) and 50 μm-thick PFSA 825EW film (203) were laminated together at 350° F. (177° C.), 150 psi (1.03 kPa) and 0.5 fpm (15 cm/s). A 0.25 mg/cm² Pt/NSTF layer (210) was decal-transferred, as described in the Preparation of Catalyst-Coated Membrane (CCM) onto the exposed surface of the dried 25 μm-thick PFSA film (202). Then, as-prepared 75 μm-thick PFSA 825EW film (201) was laminated onto the exposed side of the 0.25 mg/cm² Pt/NSTF layer (210). The resultant membrane had the construction shown in FIG. 2C.

EXAMPLE 4

Reference is made to FIG. 2D in the following example. Two 25 μm-thick PFSA 825EW films (201, 202) and 50 μm-thick PFSA 825EW film (203) were dried at 100° C. for 2 min under nitrogen prior to lamination. One 0.25 mg/cm² Pt/NSTF layer (201b) was decal-transferred, as described in the Preparation of Catalyst-Coated Membrane (CCM) onto one surface of dried 50 μm-thick PFSA film (203). Dried 25 μm-thick PFSA 825EW film (201) was laminated to the exposed surface of Pt/NSTF layer (201b) at 350° F. (177° C.), 150 psi (1.03 kPa) and 0.5 fpm (15 cm/s). One 0.25 mg/cm² Pt/NSTF (210a) was Preparation of Catalyst-Coated Membrane (CCM) onto an exposed surface of dried 25 μm-thick PFSA film (202). Then the two constructions were laminated together as shown in FIG. 2D.

EXAMPLE 5

Reference is made to FIG. 2E in the following example. Two 50 μm-thick PFSA 825EW films (201, 202) were dried at 100° C. for 2 min under nitrogen prior to lamination. One 0.05 mg/cm² Pt/NSTF layer (210) was decal-transferred, as described in the Preparation of Catalyst-Coated Membrane (CCM) onto one surface of dried PFSA film (202). Then an additional 50 μm-thick PFSA 825EW film (201) was laminated onto the exposed side of the Pt/NSTF film, resulting in the construction shown in FIG. 2D.

Preparation of Membranes Electrode Assemblies (MEAs)

To estimate the capability of the hydrogen crossover mitigated membranes, CCMs were prepared generally according to the Preparation of Catalyst-Coated Membrane (CCM) procedure (hereinbefore). Pt catalysts deposited onto the NSTF (0.25 mg Pt/cm$^2$) were used in the cathode catalytic layer and Iridium (Ir) catalysts deposited onto the NSTF (0.50 mg Ir/cm$^2$) were used in the anode catalytic layer.

The resultant membrane electrode assemblies 300a-300e prepared by this method from membranes 200a-200e are shown in FIGS. 3A-3E, respectively.

Hydrogen Crossover/Cell Performance Test of CCMs

The H$_2$ mol % (concentration in mole percent) in O$_2$ was measured by using an Agilent 490 microGC gas chromatography under ambient pressure. According to the results presented in FIG. 2-5, the membranes containing Pt/NSTF as an "internal" catalyst layer gave significant reduction in hydrogen crossover. These results indicate that the Pt/NSTF positioned in the membrane provide effective catalytic sites for formation of water from recombination of hydrogen and oxygen. TABLE 1, below reports Cello Voltage and H$_2$ mol % in O$_2$ of CCM Example 4 (25/NSTF/25/NSTF/50) as a function of current density. In Table 3, a "0" in column three means H$_2$ mol % in O$_2$ stream was below detection limit of the measurement technique employed.

TABLE 1

| CURRENT DENSITY, A/cm$^2$ | CELL VOLTAGE, V | MOL % H$_2$ in O$_2$ |
| --- | --- | --- |
| 2 | 1.78 | 0 |
| 1 | 1.67 | 0 |
| 0.5 | 1.60 | 0 |
| 0.25 | 1.55 | 0 |
| 0.1 | 1.51 | 0 |
| 0.005 | 1.48 | 0 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A water electrolyzer comprising:
   a membrane having first and second opposed major surfaces and comprising:
   a first membrane layer comprising a first ion-conductive polymer;
   a second membrane layer comprising a second ion-conductive polymer; and
   a first platinized nanostructured layer disposed between the first layer and the second layer, wherein the first platinized nanostructured layer comprises close-packed whiskers having at least one of platinum or platinum oxide disposed thereon;
   a cathode disposed on the first major surface of the membrane, the cathode comprising a first catalyst consisting essentially of either or both of metallic platinum and platinum oxide; and
   an anode disposed on the second major surface of the membrane, the anode comprising a second catalyst, the second catalyst comprising at least 95 percent by weight of collectively metallic iridium and iridium oxide, calculated as elemental iridium, based on the total weight of the second catalyst, wherein at least one of metallic iridium or iridium oxide is present, wherein the membrane does not further comprise a third membrane layer comprising a third ion-conductive polymer, wherein the membrane does not further comprise a second platinized nanostructured layer disposed between the second membrane layer and the third membrane layer, and wherein the first and second membrane layers are unitary.

2. The water electrolyzer of claim 1, wherein the first platinized nanostructured layer has a thickness of 0.05 micrometer to 0.5 micrometer.

3. The water electrolyzer of claim 1, wherein the second catalyst consists essentially of at least one of metallic iridium or iridium oxide.

4. The water electrolyzer of claim 1, wherein the second catalyst further comprises at least one of metallic platinum or platinum oxide.

5. The water electrolyzer of claim 1, wherein the second catalyst consists essentially of at least one of metallic platinum or platinum oxide and at least one of metallic iridium or iridium oxide.

6. The water electrolyzer of claim 5, wherein the at least one of metallic iridium or iridium oxide and at least one of metallic platinum or platinum oxide have a collective weight ratio, calculated as elemental iridium and platinum, respectively, of at least 20:1 iridium to platinum.

7. The water electrolyzer of claim 1, wherein the at least one of metallic iridium or iridium oxide of the second catalyst collectively has an areal density of at least 0.01 mg/cm$^2$.

8. The water electrolyzer of claim 1, wherein the membrane further comprises polymer electrolyte.

9. The water electrolyzer of claim 8, wherein the polymer electrolyte is at least one of a perfluorosulfonic acid, a perfluorosulfonimide, or a perfluorosulfonimide sulfonic acid.

10. The water electrolyzer of claim 1, wherein the at least one of metallic platinum or platinum oxide is collectively present in the membrane at a concentration in a range from 0.05 mg/cm$^3$ to 100 mg/cm$^3$.

11. The water electrolyzer of claim 1, wherein the at least one of metallic platinum or platinum oxide is distributed throughout the membrane.

12. A method of generating hydrogen and oxygen from water, the method comprising:
   providing a water electrolyzer according to claim 1;
   providing water in contact with the anode; and
   providing an electrical current with sufficient potential difference across the membrane to convert at least a portion of the water to hydrogen and oxygen on the cathode and anode, respectively.

* * * * *